United States Patent
Guillez et al.

(10) Patent No.: US 6,585,310 B1
(45) Date of Patent: Jul. 1, 2003

(54) FOLDING ROOF FOR A CONVERTIBLE VEHICLE

(75) Inventors: Jean-Marc Guillez, Cerizay (FR); Paul Queveau, Cerizay (FR); Gerard Queveau, Cerizay (FR)

(73) Assignee: Societe Europeenne de Brevets Automobiles (FR)

( * ) Notice: Subject to any disclaimer, the term of this patent is extended or adjusted under 35 U.S.C. 154(b) by 0 days.

(21) Appl. No.: 09/936,583

(22) PCT Filed: Mar. 16, 2000

(86) PCT No.: PCT/FR00/00646

§ 371 (c)(1), (2), (4) Date: Jan. 17, 2002

(87) PCT Pub. No.: WO00/54997

PCT Pub. Date: Sep. 21, 2000

(30) Foreign Application Priority Data

Mar. 16, 1999 (FR) .............................. 99-03243

(51) Int. Cl.⁷ .................................. B60J 7/08
(52) U.S. Cl. .................. 296/108; 296/107.01; 296/121; 296/107.17
(58) Field of Search ............................ 296/108, 107.01, 296/120.1, 121, 107.16, 107.17, 107.19

(56) References Cited

U.S. PATENT DOCUMENTS

| | | | | |
|---|---|---|---|---|
| 2,939,742 A | * | 6/1960 | Dardarian et al. | 296/108 |
| 5,284,378 A | * | 2/1994 | Sautter, Jr. | 292/DIG. 5 |
| 5,328,229 A | * | 7/1994 | Brandt et al. | 296/121 |
| 5,490,709 A | * | 2/1996 | Rahn | 296/108 |
| 5,520,432 A | * | 5/1996 | Gmeiner et al. | 296/108 |
| 5,785,375 A | * | 7/1998 | Alexander et al. | 296/108 |
| 5,833,300 A | * | 11/1998 | Russke | 296/108 |
| 6,062,625 A | * | 5/2000 | Elelnrieder et al. | 296/108 |
| 6,062,628 A | * | 5/2000 | Guillez | 296/108 |

FOREIGN PATENT DOCUMENTS

| | | |
|---|---|---|
| DE | 19539085 | 4/1997 |
| EP | 0678411 | 10/1995 |
| EP | 0884208 | 12/1998 |
| FR | 713044 | 10/1931 |

* cited by examiner

Primary Examiner—D. Glenn Dayoan
Assistant Examiner—Lori L Coletta
(74) Attorney, Agent, or Firm—Bachman & LaPoint, P.C.

(57) ABSTRACT

The invention concerns a folding roof comprising a front element and a rear element, the two elements capable of being stored in the vehicle boot, and locks for locking together the front edge of the front element to the front element of the vehicle body and the rear edge of the front element to the front edge of the rear elemen. The locks are actuated by rotating rods connected to a motor. The rotating rods and the locks are arranged such that the rotation of the motor causes the control rods to rotate simultaneously and the locks to be engaged when the roof covers the vehicle.

14 Claims, 4 Drawing Sheets

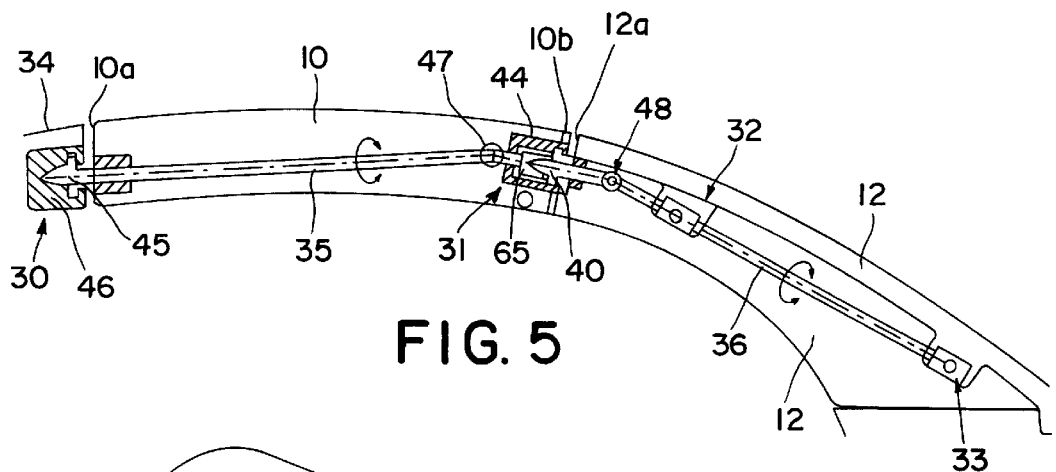
FIG. 5
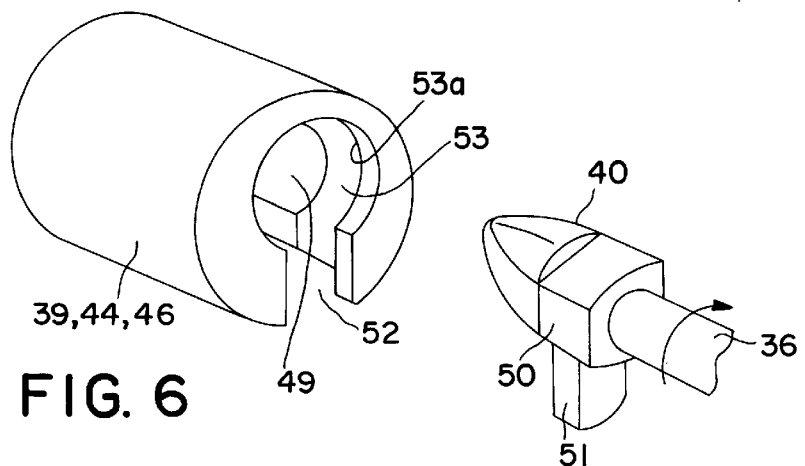
FIG. 6
FIG. 7
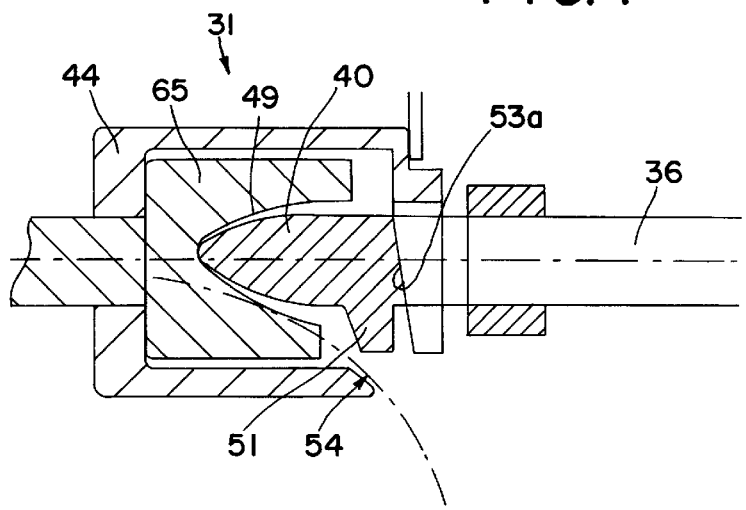
FIG. 8

FOLDING ROOF FOR A CONVERTIBLE VEHICLE

BACKGROUND OF THE INVENTION

The present invention relates to a folding roof for a convertible vehicle.

From French application No. 98 05 971 of May 12, 1988, there is known a folding roof for a convertible vehicle which is shown in the appended FIGS. 1 and 2.

Said folding roof for a convertible vehicle comprises a front element 10 hinged at 11 to a rear element 12, the rear end 12b of which is hinged at 13 relative to the vehicle. The two elements 10, 12 can be stored in the vehicle boot 14 such that the front element 10 is folded over the rear element 12 linked through its hinge 13 relative to the vehicle.

The rear element 12 comprises a center element 15 which extends to the hinge 11 between the front element 10 and the rear element 12. This center element 15 is hinged in 19b relative to the rear element 12 and cooperates with means which, in the position of the roof where it is stored in the boot 14, maintains the center element 15 at a distance above the rear element 12.

The front element 10 is attached in an articulated manner at 17 to the end of a beam 18 arranged on each side of the vehicle, with its other end attached in an articulated manner at 19a to the vehicle. The beam 18 is adapted to maintain the front element 10 in a substantially horizontal position when the rear element 12 is pivoted towards the boot about its hinge 13.

The center element 15 is connected to a beam 17a through an arm 19 extending from this center element, the other end of beam 17a being hinged to the vehicle frame in 16. The arm 19 is arranged so as to allow the center element 15 to be pivoted about its hinge 19b in a direction opposite the pivoting direction of the rear element about hinge 13.

Each arm 19 has an end attached in an articulated manner at 20 to the beam 17a and an end 21 which is integral with the edge of the center element 15.

Each beam 17a has an end which is attached in an articulated manner at 20 to the arm 19 and another end hinged at 16 to the vehicle body.

The pivoting of the roof is controlled by an electric motor 22 driving, by means of two half-shafts 23 and a pinion 24, a pinion or toothed sector 25 integral with the rotation axis 13 of the roof rear element 12.

The pivoting movement of the roof can be balanced by means of a jack 26.

When the front, rear and center elements are in the closed position of the roof, it is appropriate to lock them together and relative to the vehicle body.

This locking problem is encountered in all models of folding hard top roofs, whatever the respective paths of the various movable roof elements constituting a folding hard top roof.

Similarly, when the roof is in its folded position within the rear boot of the vehicle, it is necessary to lock at least the rear roof element to a fixed portion within the boot.

SUMMARY OF THE INVENTION

The object of the present invention is to provide the above-mentioned locks by means of a centralized locking system, which is safe, efficient and of relatively low cost.

The present invention therefore aims at providing a folding roof for a convertible vehicle, comprising a front element and a rear element, said two elements being capable of being stored in the vehicle boot, and locks for locking together the front edge of the front element to the vehicle body, and the rear edge of the front element to the front edge of the rear element, said locks being actuated by control rods. According to this invention, the roof is characterized in that the control rods are rotating rods connected to a motor, the rotating rods and the locks being arranged such that the rotation of the motor causes the control rods to rotate simultaneously and the locks to be engaged when the roof covers the vehicle.

According to a preferred embodiment of the invention, the vehicle boot includes a lock element cooperating with a lock element provided on the front edge of the rear element, for locking the latter when it is positioned in the vehicle boot.

Other features and advantages of the present invention will become clear from the following description.

BRIEF DESCRIPTION OF THE DRAWINGS

In the following drawings given by way of non-limiting examples:

FIG. 5 is a lengthwise cross-section view of the folding roof;

FIG. 6 shows the body of a lock element of the locking device;

FIG. 7 shows the finger of another lock element of the locking device;

FIG. 8 shows a cross-section of the finger when engaged in the housing of the lock body provided between the front and rear roof elements;

DETAILED DESCRIPTION OF THE PREFERRED EMBODIMENT(S)

Figure 1:
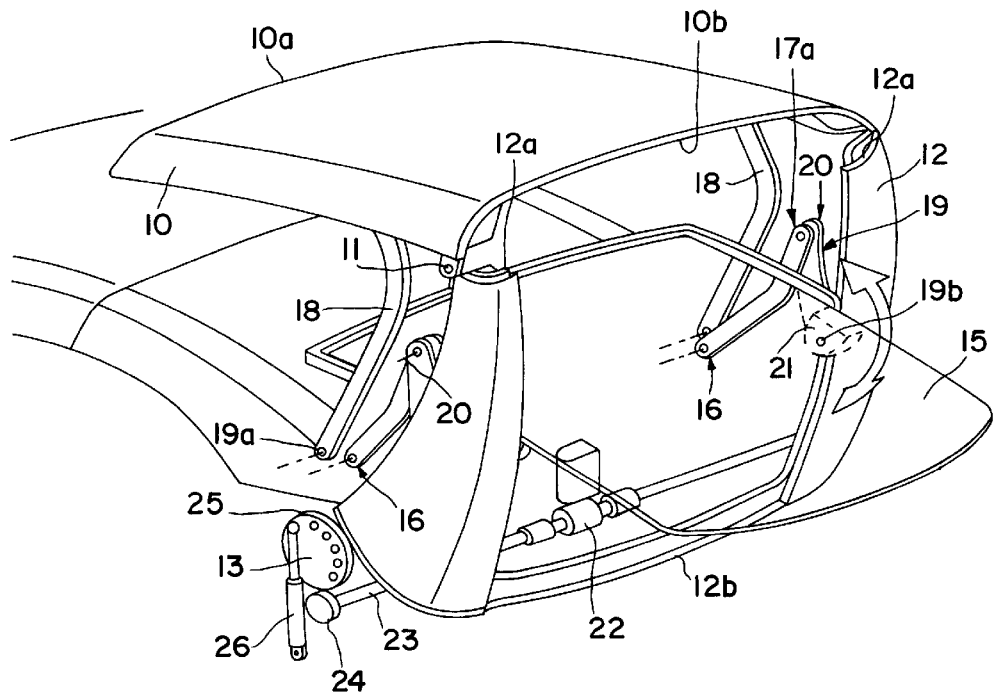
FIG. 1 is a perspective view of a folding roof shown in an earlier French patent application.
Figure 2:
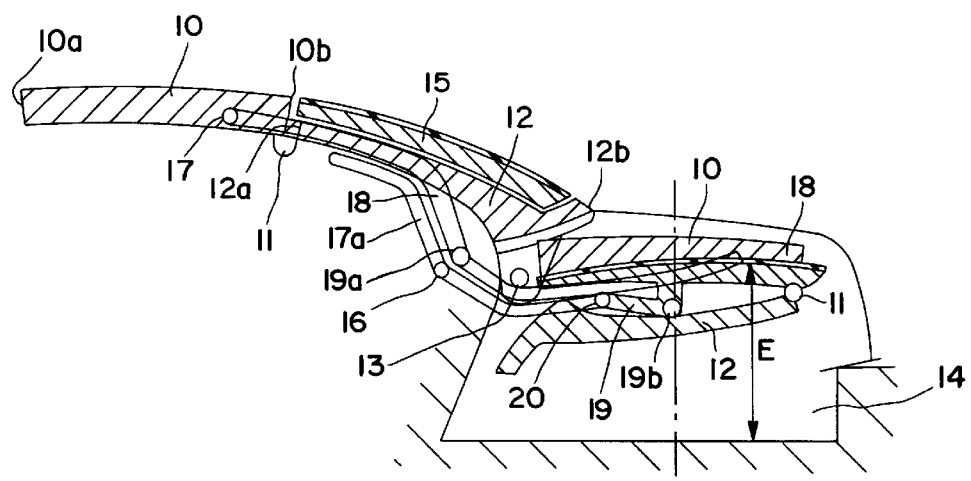
FIG. 2 is a side sectional view of the roof of FIG. 1.

An embodiment of the folding roof according to the present invention, which is adapted to the folding roof shown in FIGS. 1 and 2, will be described below.

Figure 3:
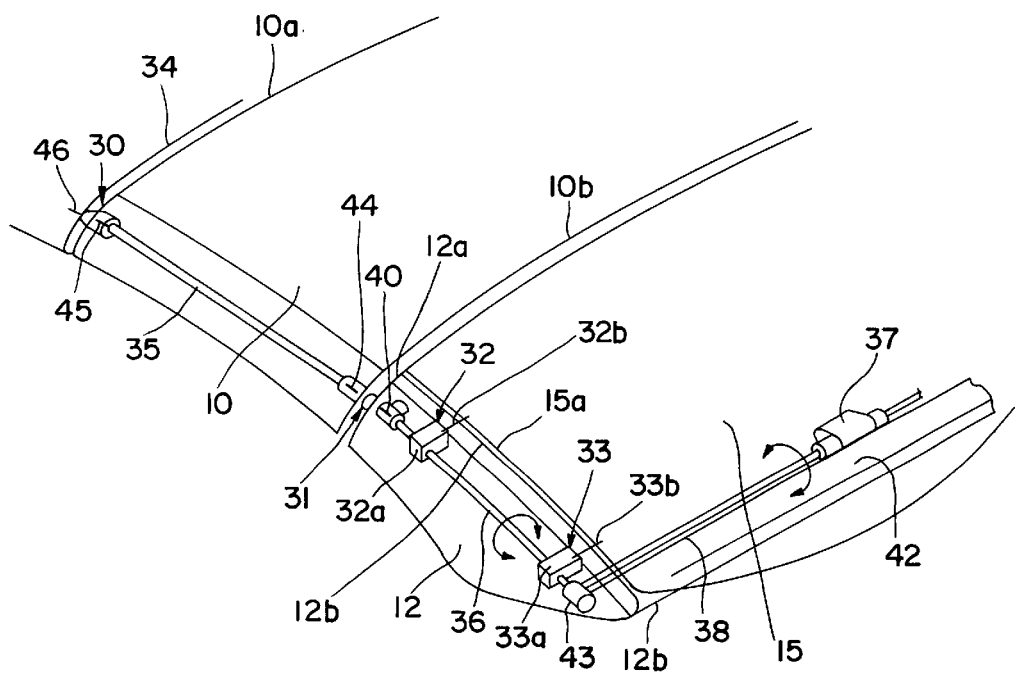
FIG. 3 is a partial perspective view of a folding roof according to the present invention.

The locking device shown in FIG. 3 comprises locks 30, 31, 32, 33 for locking together:

the front edge 10a of the front element 10 to the vehicle body 34;

the rear edge 10b of the front element 10 to the front edge 12a of the rear element 12;

the adjacent edges 12b, 15a of the rear element 12 and the center element 15.

Said locks 30, 31, 32, 33 are linked together through control rods 35, 36 which are in turn linked through a rod 38 to a single electric motor 37, the rotation of which causes the control rods 35, 36, 38 to rotate simultaneously and the locks 30, 31, 32, 33 to be engaged when the roof elements 10, 12, 15 cover the vehicle.

Figure 4:
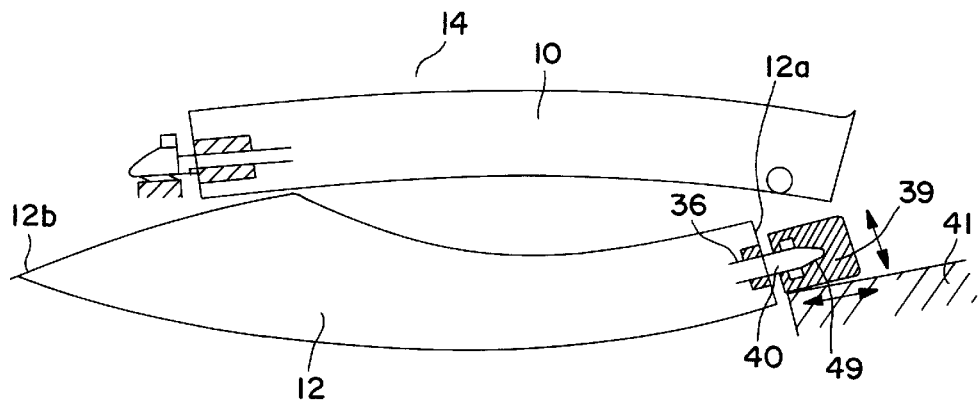
FIG. 4 shows the roof in its folded position in the rear boot of the vehicle.

On the other hand, as shown in FIG. 4, the vehicle boot 14 has a lock element 39 integral with a fixed portion 41, cooperating with a complementary lock element 40 provided on the front edge 12a of the rear element 12, for locking the latter when it is positioned in the vehicle boot 14 (see below).

It is also seen in FIG. 3 that the electric motor 37 is fixed to a cross beam 42 which links together the rear portion of both side elements forming the rear element 12.

Moreover, the electric motor 37 is connected through a rod 38 to a corner gear assembly 43 located behind one of the side portions of rear element 12. From this corner gear assembly 43 (see FIG. 5) extends a rod 36 connected to two lock elements 32a, 33a, which cooperate with a complementary lock element 32b, 33b attached to the center element 15 for locking together the rear element 12 to the center element 15.

The rod 36 is connected, on the one hand, to one element 40 of lock 31 located on the front edge 12a of the rear element 12 and cooperating with a complementary lock element 44 of lock 31 located on the rear edge 10b of the front element 10 for locking together the rear element 12 to the front element 10.

The above-mentioned complementary lock element 44 is connected through a rod 35 to an element 45 of the lock 30 which is located on the front edge 10a of the front element 10 and cooperates with a complementary lock element 46 attached to the vehicle body 34 for locking the front element 10 to said body 34.

FIG. 5 further shows that rods 35 and 36 include gimbals 47, 48 so that they can follow the curvature of roof elements 10, 12.

On the other hand, the lock elements for locking the rear element 12 to the front element 10 and the front element 10 to the vehicle body 34 comprise (as also shown in FIGS. 6, 7 and 8) a conical finger 40, 45 carried by the end of rod 36, 35, capable of being engaged, when the roof is being closed, into a housing 49 having a conical shape complementary with finger 40, 45, formed in bodies 44, 46, the first of which is carried by the rear edge 10b of the front roof element 10, and the second of which is supported by the vehicle locking element 34, or within the body 39 provided in the boot 14.

Furthermore, the finger 40 carried by the end of rod 36 adjacent the front edge 12a of the rear element 12 and the rear edge 10b of the front element 10, includes means cooperating with complementary means provided in the corresponding housing 49, for making both rods 36, 35 rotationally integral with each other when the rear element 12 and the front element 10 are in the closed position of the roof. Said means comprise flat portions 50 of finger 40 coinciding with complementary flat portions (not shown) provided on the inner walls of housing 49.

For allowing the rod 36 to cause rod 35 to rotate, the lock 31 comprises a socket 65 pivotally mounted within the body 44. The socket 65 carries at its rear end the housing 49 adapted to receive finger 40 of rod 36 and is connected at its front edge to the rod 35 so as to make it rotationally integral with said rod 35.

Thus, the rod 36, through its finger 40 inserted within the housing 49 of socket 65, causes said socket 65 to rotate, which in turn drives rod 35.

On the contrary, housing 49 is directly formed within bodies 46 and 39.

It is also seen in FIGS. 7 and 8 that each finger 40 supports, at a distance from a free end thereof, a pin 51 capable of being engaged into an axial opening 52 of the body 44, 46, 39, and then, after having rotated, to engage a groove 53 of said body 44, 46, 39 (see FIG. 6) for locking the corresponding lock 30, 31.

Moreover, the rear face 53a of groove 53 has a helical shape, so that when the pin 51 rotates, it rests against the helical face 53a for clamping the finger 40 within the housing 49 of body 44, 46 or 39.

As also shown in FIG. 8, a downwards clearance 54 allows the insertion direction of finger 40 within housing 49 to be adapted. Said direction is given by the two roof elements 10 and 12 being hinged about their axis 11.

Figure 9:
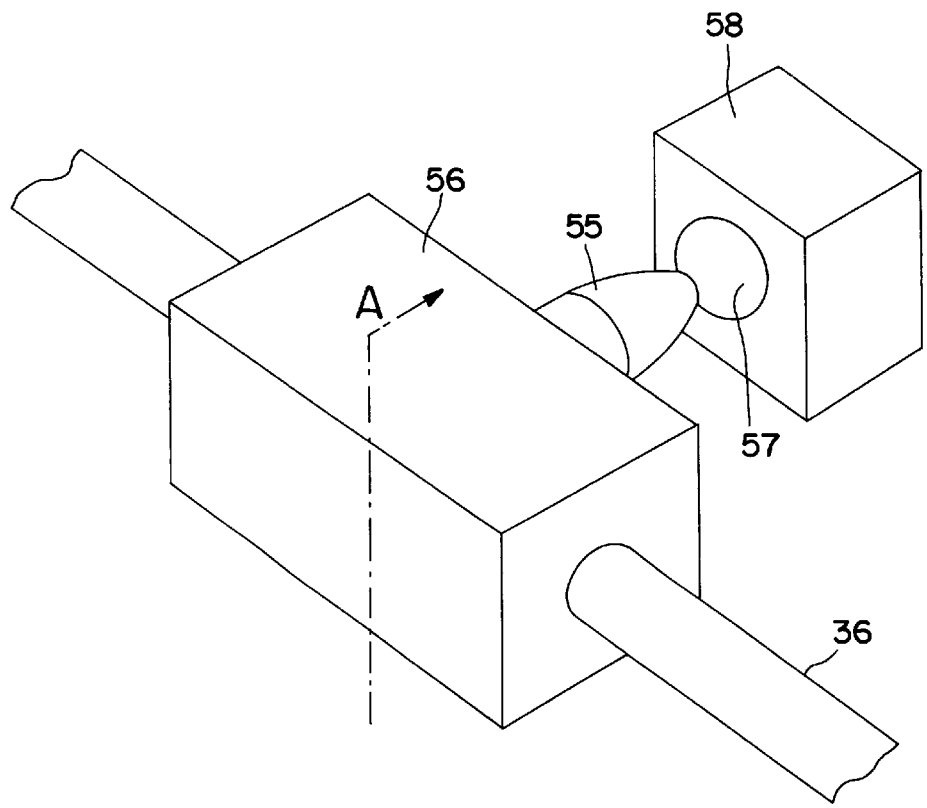
FIG. 9 is a perspective view of another locking device of the folding roof according to the present invention.
Figure 10:
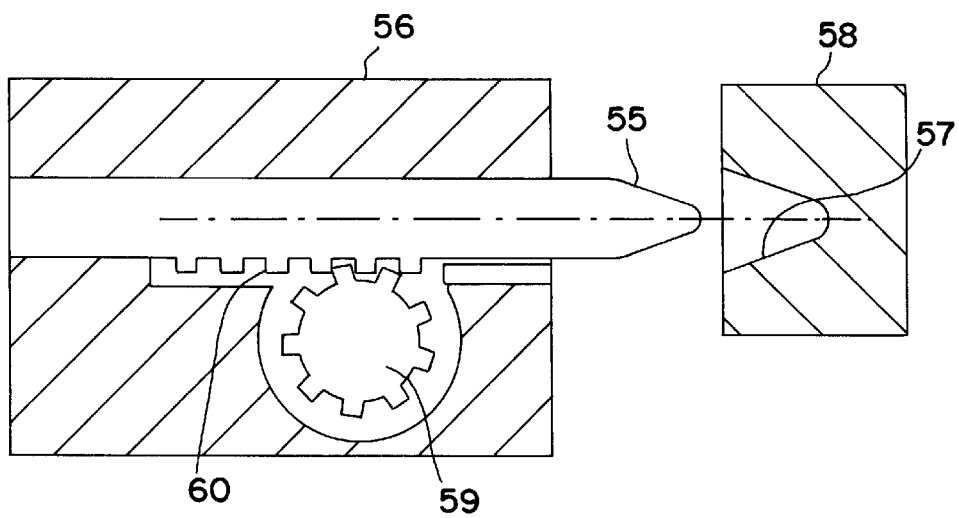
FIG. 10 is a cross-sectional view along line A in FIG. 9.

FIGS. 9 and 10 show the lock elements used for locking the rear element 12 to the center element 15. They comprise a conical finger 55 mounted so as to slide within a body 56 which is integral with the rear element 12. Said finger 55 can be engaged into a housing 57 of complementary conical shape formed in a body 58 integral with center element 15. Furthermore, the rod 36 which is located between the corner gear assembly 43 and the front edge 12a of the rear element 12 includes means cooperating with complementary means associated with finger 55 for transforming the rotation movement of rod 36 into a translation movement of the finger 55.

In the example shown in FIG. 8, such means comprise a pinion 59 supported by the rod 36 and meshed with a rack 60 carried by the finger 55.

The above-disclosed locking device comprises a series of rods 35, 36, 38, of corner gear assemblies 43 and lock elements arranged symmetrically on each side of the vehicle axis.

The operation of the locking device described so far will be explained below.

It will be assumed that the control for displacing the roof elements 10, 12, 15, which are initially in their folded position in the boot, has just been actuated towards the closed position of the roof.

At the end of the closure operation, fingers 40 of locks 30, 31 engage into the housing 49 of bodies 46, 44. The pins 51 of fingers 40 which are carried by rods 35, 36, are angularly shifted by 180°, as shown in FIG. 5, and are not engaged into the helical groove 53.

Furthermore, the fingers 55 of locks 32, 33 are not yet locked within the corresponding housings 57.

For locking the roof elements together and with the vehicle body, it is sufficient to cause the single electric motor 37 to be started. The electric motor 37 drives the rods 38 and 36 in its rotation.

The finger 40 carried by the rod 36 turns by about three quarters of a turn, for example.

The pin 51 of finger 40 engages into the helical groove 53, so that the rear element 12 is locked and clamped against the front element 10.

At the same time, the rotation by three quarters of a turn of the rod 36 displaces the fingers 55 of locks 32 and 33, through the pinion 59 and rack 60 within the housings of bodies 58 which are integral with the center element 15, so that the rear element 12 and the center element 15 are locked together.

Moreover, the rotation of rod 36 also causes the rod 35 to rotate over three quarters of a turn.

The pin 51 which is carried by the finger 40 at the end of rod 35 engages into the housing 49 of body 46 attached to the vehicle body 34.

The single electric motor 37 thus causes all of the locks to be locked.

For opening the roof, the operation is the reverse of the one just described. Starting the motor 37 sequentially controls, through rods 38, 36, 35, the unlocking of locks 33, 32, 31 and 30.

Another control device then moves the roof element 10, 12 within the boot in which they have just been folded on top of each other, as shown in FIG. 4.

In this position, the motor 37 causes the roof elements 10, 12, to be locked through the locking fingers 40 and elements such as 39, which are fixed to the vehicle body 41.

Of course, the present invention is not restricted to the above-described example and many changes can be made thereto within the scope of the present invention.

In particular, the pivoting rods and lock elements described above can be mounted on other kinds of folding roofs than the one described above, which comprise at least two movable roof elements. It is then needed to adapt the position of the axial opening 52 and that of the clearance 54 of each lock as a function of the path followed by the corresponding edge of each roof element.

What is claimed is:

1. A folding hard top roof for a convertible vehicle, comprising at least one front roof element and one rear roof element, said front and rear roof elements each being movable relative to each other and to a vehicle body and being stored in a vehicle boot, locks for locking together at least affront edge of the at least one front roof element to the vehicle body and a rear edge of the at least one front roof element to a front edge of the rear roof element, said locks being actuated by control rods, said control rods comprising first and second rotating rods connected to a motor, and the rotating rods and the locks being arranged such that rotation of the motor causes the control rods to rotate simultaneously and the locks to be engaged when the roof covers the vehicle.

2. A roof according to claim 1, further comprising the boot of the vehicle including a first lock element cooperating with a second lock element provided on the front edge of the rear roof element for locking the rear roof element when the rear roof element is positioned in the vehicle boot.

3. A roof according to claim 2, further comprising the motor being fixed to a cross beam supported by the rear roof element and being connected through a third rod to a corner gear assembly located behind at least one of the side portions of the rear roof element, and said corner gear assembly having one of the rotation rods extending therefrom and being supported by the rear roof element.

4. A roof according to claim 3, further comprising said one rotating rod supported by the rear roof element being connected to said second lock element and cooperating with a third lock element located on the rear edge of the at least one front roof element for locking together the rear roof element and the at least one front roof element, said third lock element being connected through said first rotating rod to a fourth lock element located on the front edge of the at least one front roof element and cooperating with a fifth lock element attached to the vehicle body for locking the at least one front roof element to said vehicle body.

5. A roof according to claim 4, wherein said second and fourth lock elements each comprise a finger carried by an end of a corresponding one of the rotating rods, each said finger being engaged when the roof is being closed into a housing having a shape complementary to said finger, and each said finger being formed within a respective body, a first one of said bodies being supported by the rear edge of the at least one front roof element, and a second one of said bodies being supported by the vehicle body.

6. A roof according to claim 5, wherein the finger carried by the end of the rod adjacent to the front edge of the rear roof element and the rear edge of the at least one front roof element includes first means that cooperate with complementary means provided within the housing of the corresponding body for making the rotating rods rotationally integral when the rear roof element and the at least one front roof element are in the closed position of the roof.

7. A roof according to claim 6, wherein the housing of the corresponding body is formed at a rear end of a socket mounted so as to be pivoted within said corresponding body and being connected to the rotating rod supported by the at least one front roof element so as to be rotationally integral with said rotating rod.

8. A roof according to claim 5, wherein each said finger carries, at a distance from a free end thereof, a pin that can be engaged into an axial opening of the respective body, and then, after having rotated, is capable of engaging a groove of said body.

9. A roof according to claim 8, wherein a rear face of the groove is of helical shape, so that when the pin rotates, said pin rests against said helical face for clamping the finger in the housing of the respective body.

10. A roof according to claim 1, further comprising the rear roof element including a center element which extends to a hinge between the at least one front roof element and the rear roof element, said center element being hinged relative to the rear roof element, locks for locking together adjacent edges of the rear roof element and the center element, and one of the rods being connected to at least one lock element cooperating with a complementary lock element fixed to the center element for locking the rear roof element to the center element.

11. A roof according to claim 10, wherein the lock elements for locking the rear roof element to the center element comprise a finger which is mounted so as to slide within a body integral with the rear roof element, said finger being engaged in a complementary housing formed in a body integral with the center element, the one rod located between a corner gear assembly and the front edge of the rear roof element including means that cooperate with the finger for transforming the rotation movement of the one rod into,-a translation movement of the finger.

12. A roof according to claim 11, wherein said means comprises a pinion carried by the one rod and meshed with a rack carried by said finger.

13. A roof according to claim 5, wherein the finger and the housing are conical.

14. A roof according to claim 3, wherein said roof has a second set of rods, the corner gear assembly and lock elements arranged on an opposite side of a vehicle axis.

* * * * *